(12) United States Patent
Paul et al.

(10) Patent No.: US 11,564,076 B2
(45) Date of Patent: Jan. 24, 2023

(54) SYSTEMS AND METHODS FOR RETRIEVING SPECIFIC AND ADJACENT STRUCTURE NETWORK MAPS IN REAL TIME

(71) Applicant: PCTEL, Inc., Bloomingdale, IL (US)

(72) Inventors: Sumeet Singh Paul, Evanston, IL (US);
Stephen V. Saliga, Akron, OH (US);
Fritz E. Freidinger, Glenview, IL (US)

(73) Assignee: PCTEL, INC., Bloomingdale, IL (US)

( * ) Notice: Subject to any disclaimer, the term of this patent is extended or adjusted under 35 U.S.C. 154(b) by 0 days.

(21) Appl. No.: 17/520,242

(22) Filed: Nov. 5, 2021

(65) Prior Publication Data

US 2022/0060878 A1  Feb. 24, 2022

Related U.S. Application Data

(62) Division of application No. 16/988,946, filed on Aug. 10, 2020, now abandoned.

(60) Provisional application No. 62/885,153, filed on Aug. 9, 2019.

(51) Int. Cl.
*H04W 4/90* (2018.01)
*G08B 21/02* (2006.01)
*H04W 4/02* (2018.01)
*H04W 4/029* (2018.01)

(52) U.S. Cl.
CPC .............. *H04W 4/90* (2018.02); *G08B 21/02* (2013.01); *H04W 4/023* (2013.01); *H04W 4/029* (2018.02)

(58) Field of Classification Search
CPC ....... H04W 4/023; H04W 4/029; H04W 4/90; G08B 21/02
See application file for complete search history.

(56) References Cited

U.S. PATENT DOCUMENTS

| 7,676,249 | B2 | 3/2010 | Willey |
| 8,639,212 | B1 | 1/2014 | Sennett et al. |
| 2009/0227224 | A1 | 9/2009 | Aftelak et al. |
| 2010/0279647 | A1 | 11/2010 | Jacobs et al. |
| 2013/0065628 | A1 | 3/2013 | Pfeffer |

(Continued)

OTHER PUBLICATIONS

International Search Report from corresponding PCT application PCT/US2020/045683 dated Dec. 29, 2020.

(Continued)

*Primary Examiner* — Dai Phuong
(74) *Attorney, Agent, or Firm* — Husch Blackwell LLP

(57) ABSTRACT

Systems and methods for retrieving RF coverage data for a geographic location and using the RF coverage data for the geographic area to alert a user device are provided. In some embodiments, such systems and methods can include receiving a notification of an emergency event at an emergency dispatch location associated with the geographic location, and pushing the RF coverage data for the geographic location to a first user device or directing the first user device to retrieve the RF coverage data for the geographic location. In some embodiments, such systems and method can include detecting when an ambient location of a second user device indicates proximity to and/or possible or likely entry of the second user device to a portion of the geographic area associated with the RF coverage data that is below a predetermined threshold and, responsive thereto, transmitting an alert to the second user device.

8 Claims, 3 Drawing Sheets

(56) References Cited

U.S. PATENT DOCUMENTS

| | | | | |
|---|---|---|---|---|
| 2014/0171102 A1* | 6/2014 | Murphy | ................ | H04W 64/00 |
| | | | | 455/456.1 |
| 2016/0014475 A1 | 1/2016 | Russell et al. | | |
| 2016/0063527 A1* | 3/2016 | MacDonald | ....... | G06Q 30/0201 |
| | | | | 705/7.31 |
| 2017/0199919 A1* | 7/2017 | Liu | ........................ | H04W 4/02 |
| 2019/0058976 A1 | 2/2019 | Pearce et al. | | |
| 2020/0329340 A1 | 10/2020 | Rahman | | |
| 2020/0372426 A1* | 11/2020 | Keaton | ................ | H04W 4/024 |
| 2020/0394739 A1* | 12/2020 | Way | ...................... | G06F 16/909 |
| 2020/0412683 A1* | 12/2020 | Yu | ........................ | H04L 51/222 |
| 2021/0153065 A1 | 5/2021 | Adjakple et al. | | |

OTHER PUBLICATIONS

Written Opinion from corresponding PCT application PCT/US2020/045683 dated Dec. 29, 2020.
International Search Report from PCT application PCT/US2020/045683 dated Dec. 29, 2020.
Written Opinion of the International Searching Authority from PCT application PCT/US2020/045683 dated Dec. 29, 2020.
International Preliminary Report on Patentability issued for International Application No. PCT/US2020/045683 dated Feb. 8, 2022, 11 pages.

* cited by examiner

SYSTEMS AND METHODS FOR RETRIEVING SPECIFIC AND ADJACENT STRUCTURE NETWORK MAPS IN REAL TIME

CROSS REFERENCE TO RELATED APPLICATIONS

This application is a divisional of and claims the benefits of the filing date of U.S. application Ser. No. 16/988,946 filed Aug. 10, 2020 and titled "SYSTEMS AND METHODS FOR RETRIEVING SPECIFIC AND ADJACENT STRUCTURE NETWORK MAPS IN REAL TIME.", which claims the benefit of the filing date of U.S. Provisional Application No. 62/885,153 filed Aug. 9, 2019 and titled "SYSTEMS AND METHODS FOR RETRIEVING SPECIFIC AND ADJACENT STRUCTURE NETWORK MAPS IN REAL TIME." U.S. application Ser. Nos. 16/988,946 and 62/885,153 are hereby fully incorporated by reference as if set forth fully herein.

FIELD

The present invention relates generally to systems and methods for testing a public safety network. More particularly, the present invention relates to systems and methods for retrieving specific and adjacent structure network maps in real time.

BACKGROUND

Known systems and methods for testing a public safety network in a building include a user walking through the building to collect coverage data of the public safety network for a public safety communication system and spatially organizing the coverage data via a grid overlaid on a floor plan of the building on a floor by floor basis. Then, municipalities can use the coverage data to certify the building as being suitable for occupancy and being minimally or reasonably covered by the public safety network for public safety scenarios, for example, to ensure that an emergency responder, such as police department, fire department, and/or EMT personnel, have direct access to the public safety communication system during an emergency situation.

However, as part of certifying the building, there are certain exceptions and limitations for compliance. For example, a limited number of failed test points on the grid are allowed for the municipality to certify the building. Accordingly, even when the building is certified, some areas on some floors of the building may be insufficiently covered by the public safety network for reasonable use thereof. Unfortunately, when responding to the emergency situation, there are no known systems and methods for the emergency responder to identify in real time where in the building the areas with insufficient coverage are located. Indeed, that coverage information may only be stored in a paper or electronic file with permit information for the building.

Because of this lack of access to the coverage information in real time, the emergency responder may enter the building without knowledge of the areas where he will likely lose communication with teammates and the like. Systems and methods have been developed to train and implement tactics for the emergency responder to operate when he loses communication, but only after such a loss occurs. Furthermore, only the emergency responder who loses the communication knows where he is located within the building, and when such a loss occurs, he cannot transmit any outgoing information or receive any incoming information. Indeed, emergency personnel at a command center may have access to a map of the building, but is reliant on the public safety network to communicate with the emergency responder in the building to warn the emergency responder about any danger within the building.

In view of the above, there is a continuing, ongoing need for improved systems and methods.

DETAILED DESCRIPTION

Figure 1:
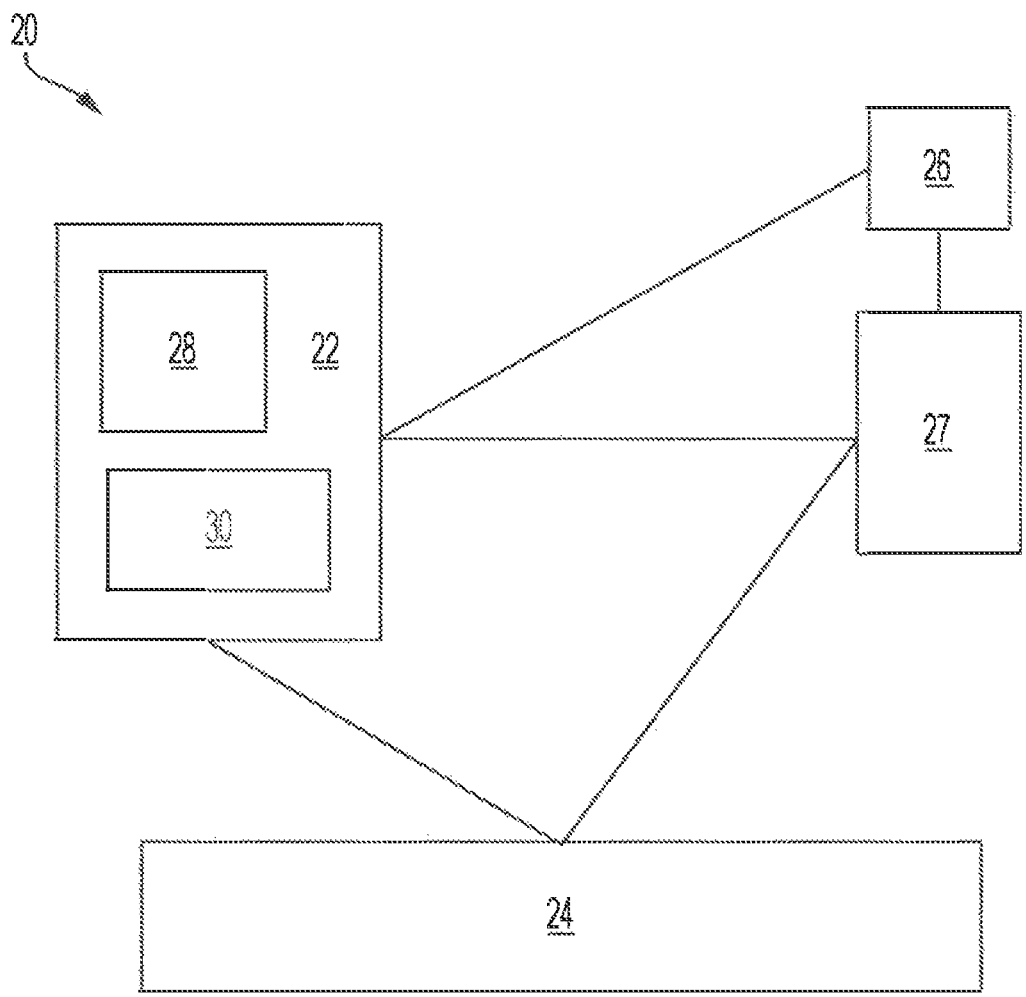
FIG. 1 is block diagram of a system according to disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for retrieving specific and adjacent structure network maps, including RF coverage data, in real time. For example, systems and methods disclosed herein can load a computation device available to emergency personnel at a command center and/or an emergency responder entering a target building during an emergency therein with coverage information necessary to inform the emergency personnel and the emergency responder about coverage limitations in the building. In some embodiments, the computation device can be loaded with the coverage information in real time while the emergency responder is in transit to the building and during the emergency, and in some embodiments, the computation device can be loaded with the coverage information at a home location of the emergency responder in response to notifications concerning the emergency.

In accordance with disclosed embodiments, systems and methods can store grid test results, that is, the RF coverage data, and/or certification results based on the grid test results in a database that organizes, stores, and/or cross-references the grid test results with geographic information for locations related to the grid test results, for example, where underlying data associated with the grid test results was collected or where the underlying data associated with the grid test results originated. In some embodiments, the geographic information can include a building address, a property identification number (PIN), a GPS location, a GPS index, a building diagram, and/or a height of a building.

As disclosed and described herein, the target building can include the building in which the emergency has been identified, and systems and methods disclosed herein can use the grid test results and/or the certification results for the target building and/or from buildings surrounding the target building, that is, adjacent buildings, for example, when the grid test results and/or the certification results are unavailable for the target building, to load the computation device with the coverage information. For example, in some embodiments, the computation device can access the database via a website either directly by entering the building address of the target building or via a link received from the emergency personnel to view the coverage information for the target building and the adjacent buildings.

In some embodiments, systems and methods disclosed herein can visually present the coverage information in 2D and/or 3D, for example, on a map, on a user interface device of the computation device to provide guidance to the emergency responder regarding areas in the target building where, based on the coverage information, poor coverage likely exists, and, therefore, that should be avoided. For example, during a fire in an apartment on a twenty-first floor of a high rise building, if there is poor coverage in a northeast stairwell on floors 15-18, then systems and methods disclosed herein can visually present the coverage information indicative of that poor coverage on the map displayed on the computation device and, in some embodiments, display a path directing the emergency responder to reach the twenty-first floor via southeast or northwest stairwells, thereby avoid the areas with the poor coverage. In some embodiments, systems and methods disclosed herein can display grid test points where the coverage limitations likely exist, that is, where the grid test points failed a coverage test, and shade those grid test points in one color, for example, red.

In some embodiments, a plurality of emergency responders can enter the target building, and each of the plurality of emergency responders can carry a respective computation device that includes a respective radio. In these or other embodiments, the respective radio of the respective computation device carried by each of the plurality of emergency responders can transmit the coverage information and real time coverage signals detected and/or generated thereby to the respective computation device carried by other ones of the plurality of emergency responders as each of the plurality of emergency responders traverses the target building. Then, the respective computation device carried by each of the plurality of emergency responders can use a combination of GPS signals and the coverage information and the real time coverage signals generated or received thereby to track other ones of the plurality of emergency responders and alert a respective one of the plurality of emergency responders and/or the emergency personnel when that one of the plurality of emergency responders is proximate any of the areas with the poor coverage.

For example, in some embodiments, the respective computation device carried by each of the plurality of emergency responders can include a tactile feedback mechanism that can vibrate in a first pattern when detecting proximity to any of the areas with the poor coverage and that can vibrate in a second, different pattern when entering any of the areas with sufficient coverage after being located in any of the areas with the poor coverage. Additionally or alternatively, in some embodiments, the respective computation device carried by each of the plurality of emergency responders can transmit notification signals to the command center when detecting proximity to any of the areas with the poor coverage.

Exemplary, but non-limiting use case scenarios of systems and methods disclosed herein can include fire department personnel driving to the target building and/or a fire chief using the coverage information to organize a plan of attacking a fire in the target building while staying in communication with each other, police department personnel responding to an emergency response, swat, hostage, and/or shooting event using the coverage information to be aware of all of the areas with the poor coverage prior to entering the target building, a surveillance team using the coverage information to ensure that all of the areas in the adjacent buildings relevant to surveilling the target building have the sufficient coverage, and/or EMT personnel using the coverage information to identify a need for relay personnel to call a hospital or a doctor when treating a patient in any of the areas with the poor coverage.

FIG. 1 is a system 20 according to disclosed embodiments. As seen in FIG. 1, in some embodiments, the system 20 can include a dispatch server 22 located at an emergency dispatch location, a municipal database device 24 remotely located from the emergency dispatch location, a first user device 26, and a second user device 27. In some embodiments, the dispatch server 22 can include a programmable processor 28 and a dispatch database device 30. Furthermore, in some embodiments, the first user device 26 can include a communication device worn by an emergency responder when responding to an emergency. Still further, in some embodiments, the second user device 27 can include a tablet, a personal computer device, a mobile device, etc. that can display RF coverage data for an identified geographic location in which an emergency is located, and in some embodiments, the identified geographic location can include a target building, the RF coverage data can be related to the target building and/or adjacent buildings thereto.

Figure 2:
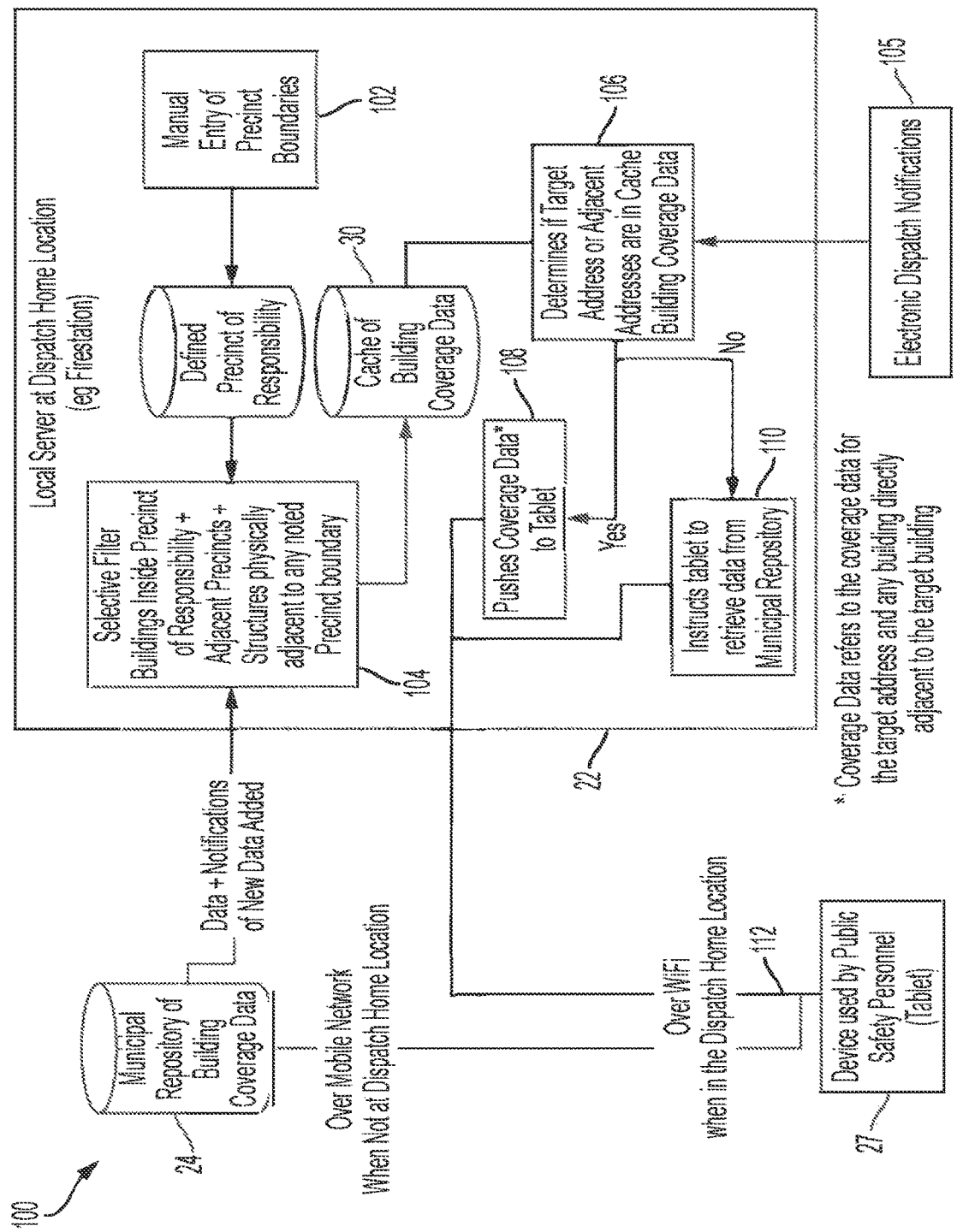
FIG. 2 is a flow diagram of a method according to disclosed embodiments.

FIG. 2 is a flow diagram of a method 100 according to disclosed embodiments. As seen in FIG. 2, the method 100 can include the programmable processor 28 receiving user input defining a boundary of a first coverage area of an emergency dispatch location associated with the dispatch server 22, as in 102. Then, the method 100 can include the programmable processor 28 accessing the municipal database device 24 to retrieve a batch of RF coverage data relevant to the first coverage area and storing or caching the batch of RF coverage data in the dispatch database device 30, as in 104. In some embodiments, the batch of RF coverage data can relate to (1) geographic locations within the first coverage area, (2) geographic locations within second coverage areas of other emergency dispatch locations adjacent to the first coverage area, and (3) geographic locations adjacent to the boundary of the first coverage area.

As also seen in FIG. 2, in some embodiments, the method 100 can include the programmable processor 28 receiving a notification of an emergency event at the identified geographic location, as in 105. Then, the method 100 can include the programmable processor 28 retrieving the RF coverage data for the identified geographic location.

For example, in some embodiments, the method 100 can include the programmable processor 28 (1) determining whether the RF coverage data for the identified geographic location is cached on the dispatch database device 30, as in 106, (2) when the RF coverage data for the identified geographic location is cached on the dispatch database device 30, pushing the RF coverage data for the identified geographic location to the second user device 27, as in 108, and (3) when the RF coverage data for the identified geographic location fails to be cached on the dispatch database device 30, directing the second user device 27 to retrieve the RF coverage data for the identified geographic location from the municipal database device 24, as in 110. In some embodiments, the method 100 can include the programmable processor 28 determining that the RF coverage data for the identified geographic location is cached on the dispatch database device 30 when the RF coverage data for the identified geographic location is included in the batch of RF coverage data previously stored in the dispatch database device 30, as in 104. Finally, the method 100 can include the second user device 27 displaying the specific RF coverage data, as in 112.

Figure 3:
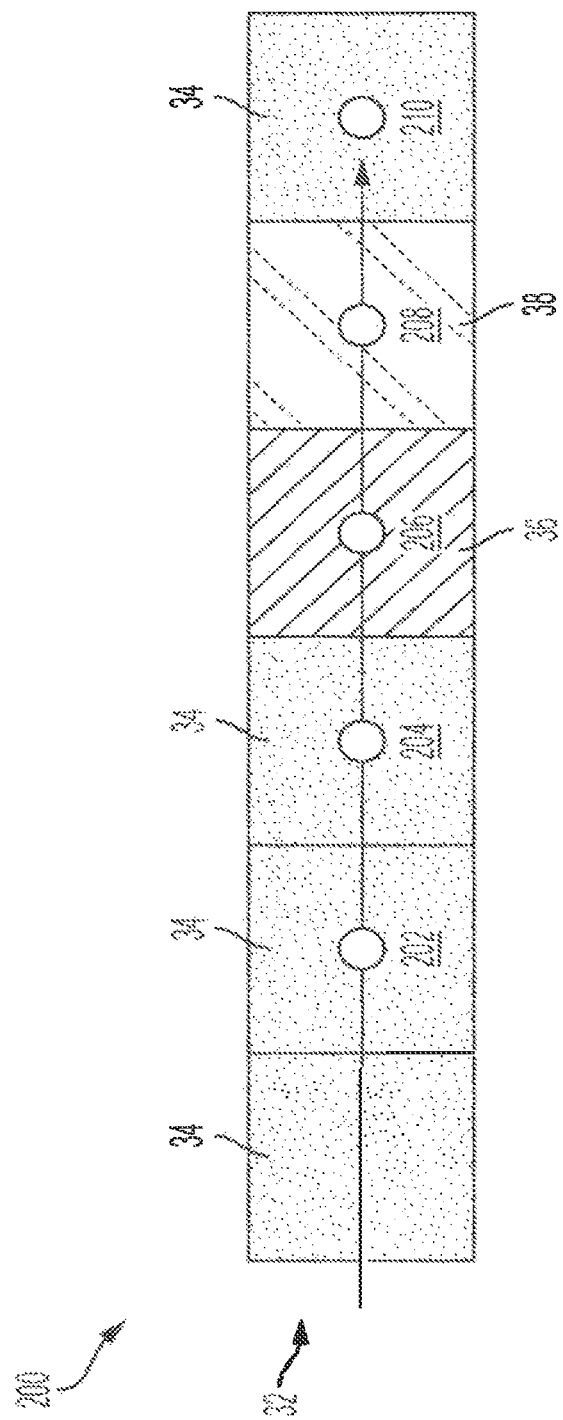
FIG. 3 is a flow diagram of a method according to disclosed embodiments.

FIG. 3 is a flow diagram of a method 200 according to disclosed embodiments. As seen in FIG. 3, the RF coverage data for the identified geographic region can be divided into a plurality of grid cells 32 that can include passing grid cells 34 (i.e. where the RF coverage data is above a predetermined threshold), failing grid cells 36 (i.e. where the RF coverage data is below the predetermined threshold), and untested or out of coverage grid cells 38 (i.e. where no RF coverage data is available or is known to be zero). In some embodiments, the method 200 can include the dispatch device 22 or the first user device 26 tracking an ambient location of the first user device 26, as in 202. Then, the method 200 can include the dispatch device 22 or the first user device 26 detecting when the ambient location of the first user device indicates proximity to and/or possible or likely entry of the first user device 26 to the failing grid cells 36, for example, based on a direction of travel and/or previously tracked locations of the first user device 26 within the identified geographic location, as in 204. In some embodiments, when the dispatch device 22 or the first user device 26 detects the ambient location of the first user device 26 indicating proximity to and/or possible or likely entry of the first user device 26 to the failing grid cells 36, the method 200 can include the dispatch device 22 transmitting a first alert to the first user device 26 and/or the first user device 26 generating the first alert that visually or physically informs a user of the first user device 26 that he is proximate to and/or likely to enter the failing grid cells 36. Similarly, the method 200 can include the dispatch device 22 or the first user device 26 detecting when the ambient location of the first user device 26 indicates proximity to and/or possible or likely entry of the first user device 26 to the untested or out of coverage grid cells 38, and responsive thereto, the dispatch device 22 transmitting a second alert to the first user device 26 and/or the first user device 26 generating the second alert that visually or physically informs the user of the first user device 26 that he is proximate to and/or likely to enter the untested or out of coverage grid cells 38. In some embodiments, the method 200 can also include the first user device 26 broadcasting a third alert when the first user device 26 detects its ambient location within the failing grid cells 36, as in 206, and can broadcast a fourth alert when the first user device 26 detects its ambient location within the untested or out of coverage grid cells 38, as in 208. Finally, the method 200 can include the dispatch device 22 or the first user device 26 detecting when the first user device 26 enters the passing grid cells 34 after being outside thereof, for example, when the ambient location of the first user device 26 is within the passing grid cells 34 after previously being undetected or after the ambient location of the first user device 26 was within the failing grid cells 36 or the untested or out of coverage grid cells 38, and responsive thereto, the dispatch device 22 transmitting a fifth alert to the first user device 26 and/or the first user device 26 generating the fifth alert that visually or physically informs the user of the first user device 26 that he has reentered the passing grid cells 34. In some embodiments, each of the first, second, third, fourth, and fifth alerts can be different types.

In some embodiments, each of the first, second, third, fourth, and fifth alerts can be different types. In this regard, it is to be understood that various embodiments for the first, second, third, fourth, and fifth alerts are contemplated, including audio, visual, and/or haptic signals broadcast from the first user device 26 with different and/or increasing lengths, intensity, volume, brightness, and/or strength.

Although a few embodiments have been described in detail above, other modifications are possible. For example, other components may be added to or removed from the described systems, and other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
  receiving a notification of an emergency event at a first emergency dispatch location associated with an identified geographic location;
  determining whether RF coverage data for the identified geographic location is cached on a first database device located at the first emergency dispatch location;
  when the RF coverage data for the identified geographic location is cached on the first database device, pushing the first RF coverage data for the identified geographic location to a user device; and
  when the RF coverage data for the identified geographic location fails to be cached on the first database device, directing the user device to retrieve the first RF coverage data for the identified geographic location from a second database device remotely located from the first emergency dispatch location.

2. The method of claim 1 further comprising:
  prior to receiving the notification, retrieving a batch of the RF coverage data from the second database device, the batch of the RF coverage data relating to (1) geographic locations within a first coverage area of the first emergency dispatch location, (2) geographic locations within second coverage areas of other emergency dispatch locations adjacent to the first coverage area, and (3) geographic locations adjacent to a boundary of the first coverage area; and
  storing and caching the RF coverage data on the first database device.

3. The method of claim 2 further comprising:
  receiving user input defining the boundary of the first coverage area.

4. The method of claim 2 further comprising:
  determining that the RF coverage data for the identified geographic location is cached on the first database device when the RF coverage data for the identified geographic location is included in the batch of the RF coverage data.

5. A system comprising:
  a programmable processor of a dispatch server device, the dispatch server being located at a first emergency dispatch location associated with an identified geographic location;
  a first database device of the dispatch server device and a user device,
  wherein the programmable processor receives a notification of an emergency event, determines whether RF coverage data for the identified geographic location is cached on the first database device, when the RF coverage data for the identified geographic location is cached on the first database device, pushes the first RF coverage data for the identified geographic location to the user device, and when the RF coverage data for the identified geographic location fails to be cached on the first database device, directs the user device to retrieve the first RF coverage data for the identified geographic location from a second database device remotely located from the first emergency dispatch location.

6. The system of claim 5 wherein, prior to receiving the notification, the programmable processor retrieves a batch of the RF coverage data from the second database device, wherein the batch of the RF coverage data relates to (1) geographic locations within a first coverage area of the first emergency dispatch location, (2) geographic locations within second coverage areas of other emergency dispatch locations adjacent to the first coverage area, and (3) geographic locations adjacent to a boundary of the first coverage area, and wherein the programmable processor stores and caches the RF coverage data on the first database device.

7. The system of claim 6 wherein the programmable processor receives user input defining the boundary of the first coverage area.

8. The system of claim 6 wherein the programmable processor determines that the RF coverage data for the identified geographic location is cached on the first database device when the RF coverage data for the identified geographic location is included in the batch of the RF coverage data.

\* \* \* \* \*